P. J. HARRIMAN
PROTRACTOR SCALE.
APPLICATION FILED SEPT. 20, 1920.

1,389,946.

Patented Sept. 6, 1921.

Inventor.
Paul J. Harriman

UNITED STATES PATENT OFFICE.

PAUL JONES HARRIMAN, OF AKRON, OHIO.

PROTRACTOR-SCALE.

1,389,946.  Specification of Letters Patent.  Patented Sept. 6, 1921.

Application filed September 20, 1920. Serial No. 411,484.

*To all whom it may concern:*

Be it known that I, PAUL J. HARRIMAN, a citizen of the United States, and a resident of Akron, county of Summit, State of Ohio, have invented an Improvement in Protractor-Scales, of which the following is a specification.

The form of protractors, which have usually been employed, consist essentially of arc-shaped scales having graduation lines which radiate from the center of the arc, the more expensive types being provided with a straight edge which swings about the center with its edge in a radial position, so that it may be brought into register with the graduations. While the more accurate work may be done, with the latter type of protractor, yet it is difficult to do perfectly accurate work even with this type, as the edge of the instrument cannot be held in exact coincidence with the line to be constructed while the line is being drawn with the drawing instrument.

The object of my invention is to provide a protractor scale which may be applied to any plane surface, in a straight line, such as a ruler, T-square, or triangle, and which, when used in conjunction with a pair of draftsman's dividers, or compasses, will enable the angle to be laid off with practically perfect accuracy.

I accomplish this object by providing a ruler, or similar device, with a straight line of an arbitrary length, adapted to be readily spanned by an ordinary pair of draftsman's dividers, and which is divided by a series of graduations, consecutively numbered from 0 to 90, said graduations indicating distances from the zero point which are equal to, or multiples of the sines of angles of one-half the number of degrees indicated by the numerals of the corresponding graduations, so that a line of a length equal to the distance from the zero point to any particular graduation on the scale will subtend a corresponding number of degrees on an arc having as its radius the unit on which the scale is based, which radius may be .5, or a multiple thereof, which is the sine of 30°, and is, therefore, indicated on the scale by the distance from the zero point to the graduation corresponding to an angle of 60°.

For a more complete understanding of my invention, reference is made to the accompanying drawing, in which:—

Figure 1:
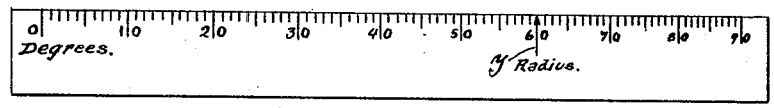
Figure 1 is a plan view of a ruler, or straight-edge provided with a scale embodying my invention.

As shown in Fig. 1 a ruler is provided with a straight line or edge which is divided by perpendicularly disposed graduation lines $x$, said graduations being numbered consecutively from 0 to 90 and suitable numerals being applied to at least every tenth space, although, it will be obvious that the numbering and variations in length of the graduation lines are entirely matters of convenience in use, and that the spaces between the graduations which are shown may be subdivided by other graduations. The form shown in the drawing has been found to be an especially convenient arrangement, and subdivisions into tenths enable the ready use of decimals in connection therewith. These spaces, as will be explained, indicate degrees and are thus identified, and, at the 60° point, a special mark is preferably formed, as the arrow $y$, which is identified as the constant radius point, and, in practice this radius, from 0 to 60 is preferably 1 decimeter, or 10 centimeters long. That is, the length of the radius is equal to the unit of the scale, or to a multiple thereof, and indicates the sine of an angle of 30°, which is .5, or the sine of one-half a 60° angle. As the metric system may be much more conveniently employed, in this connection, than English measure, the radius constant may be conveniently set at the distance above indicated.

Figure 3:
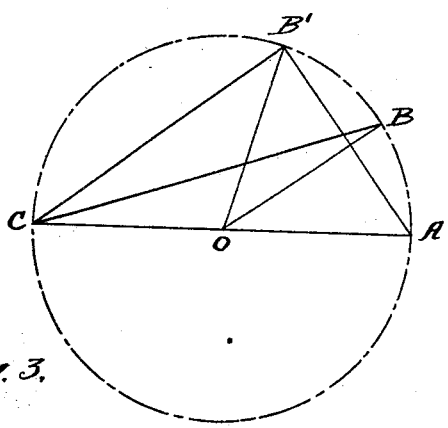
Fig. 3 is a geometrical diagram, for demonstration purposes.

The graduations from 0 to 90° are accurately laid out in direct proportion to the length of this radius, each distance from 0 to any degree point on the scale being in direct proportion to the sine of an angle of one-half the corresponding number of degrees indicated by such point, so that if a circle having the unitary distance from 0 to 60 as a radius, is inscribed about a right triangle, as A. B. C. in Fig. 3, its hypotenuse A. C. will then coincide with a diameter of the circle, and the length of the shorter side will correspond to a distance on the scale from the zero point to a certain degree point, which will be twice, in denomination, the number of degrees of the angle of the triangle opposite the shorter side A. B.

As it may be proved geometrically that this angle is exactly one-half the angle which would be formed by drawing a line from the vertex of the right angle of the triangle to the center O, of the hypotenuse, which is the center of the circle in which the triangle was inscribed, it follows that if the distance on the scale for a certain number of degrees is laid out, as a chord, on an arc having the distance from 0 to 60 as a radius and lines are drawn from the ends of the chord to the center of the arc, an angle having the same number of degrees will be constructed.

Figure 2:
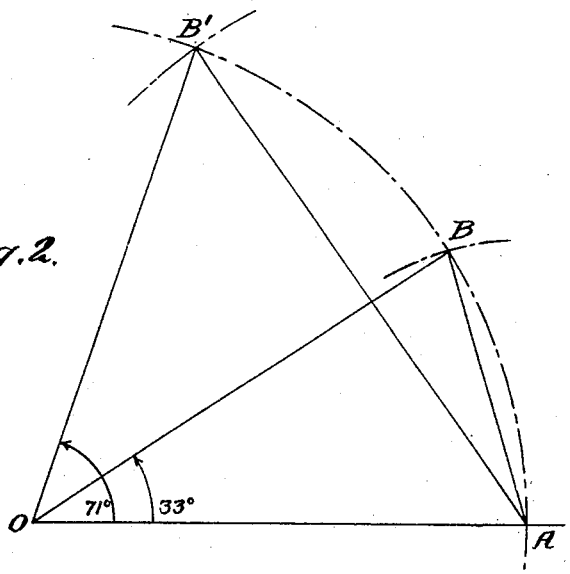
Fig. 2 is a diagram illustrating the method of laying off angles by means of the scale.

Therefore, as illustrated in Fig. 2, in using the scale, to lay off an angle of a certain number of degrees from the line O, A, which will have its vertex at the point O, the dividers are first set to span the distance to the 60° point, and then with the point O as a center, this distance is measured on the line, to A, and from this point A an arc is struck of suitable length in the direction of the angle desired. The dividers are then set again on the scale so that they span the distance from the zero point to the degree point corresponding the number of degrees of angularity desired, and, with one leg of the dividers on the point A, a short arc is struck, which intersects, at B, the arc which has been struck from the center O.

Then a line is drawn from points B to O giving the desired angle A. O. B.

To prove that this line A. B. varies directly as the sine of ½ the angle which is thus formed, reference is made to Fig. 3, in which two right triangles A. B. C. and A. B′. C are shown as inscribed in a circle having the scale unit 0 to 60°, as a radius, and having the sides A. B. and A. B′. represent distances from the zero point to any two points on the scale.

It may be demonstrated geometrically that:

I. $\angle AOB = 2 \angle ACB$, or $\angle ACB = \frac{1}{2} \angle AOB$

By trigonometry

II. Sine $\angle ACB = \frac{AB}{AC}$ and

III. Sine $\angle ACB' = \frac{AB'}{AC}$

Combining these equations in a proportional equation—

IV. $\frac{\text{Sine } \angle ACB}{\text{Sine } \angle ACB'} = \frac{\frac{AB}{AC}}{\frac{AB'}{AC}} = \frac{AB}{AB'}$ In accordance with proposition I., by substitution—

V. $\frac{\text{Sine } \frac{1}{2} \angle AOB}{\text{Sine } \frac{1}{2} \angle AOB'} = \frac{AB}{AB'}$ Therefore, each distance from the zero point to any one of the graduations or degree points, on the scale, is in direct proportion to the sine of the angle having one-half the corresponding number of degrees, indicated by the graduation, each of said distances thus being equal to the chord which will subtend the arc which measures an angle having the full number of degrees indicated by the graduation.

If the distance on the scale from 0 to 60 is 1 decimeter, or 10 centimeters, as shown, then the total length of the scale from 0 to 90 will be 14.14 centimeters, the sine of ½ 60°, or 30°, being .5 and the sine of ½ 90°, or 45° being .707, as may be ascertained from any table of natural sines. That is, on the basis of centimeters, the factor 20 is used to determine the actual line as distance in each instance. For example the sine of an angle of 20° is .342, so that the distance from 0 to 40 on a scale made up on the above basis would be 6.84 centimeters.

From the foregoing description it will be apparent that any angle may be quickly laid off with perfect accuracy by the employment of a pair of dividers in conjunction with the scale above described, and it will be also apparent that the scale is adapted for application to any plane surface, such as a ruler, T-square, or draftman's triangle, so that it may be conveniently carried about and employed, and the provision of a separate drafting instrument for the purpose of laying off angles will be unnecessary.

It will be understood that, while it is desirable, as a matter of convenience and accuracy, that the scale be actually provided with a straight line, the actual formation of a straight line thereon is not essential, it merely being essential that the graduations be made with relation to an imaginary straight line, so that it will be understood that, in the claims, the limitation to a straight line is intended to include either an actual or an imaginary straight line.

It will also be understood that it would be possible to secure the same results if the graduations were laid out on a curved or an irregular line, provided the straight line distance from the zero point to each graduation thereon were the same as the corresponding distances would be if laid out on a straight line, or if a series of suitably numbered points were provided which were arranged at straight line distances from the zero point corresponding to the distances from this point on the scale to the respective graduations. However, the form of the invention shown is more workable and convenient than any other form of which I am aware.

I claim:

1. A protractor scale having a line divided by consecutively numbered graduations, one of which indicates the unit on which the scale is based, and all of which indicate straight line distances from the initial point of the line which are each equal to the sine of an angle having a number of degrees corresponding to the numeral of the graduation.

2. A protractor scale having a graduated line, the graduations thereof being consecutively numbered and so arranged that the straight line distances from the zero point to each of said graduations is in direct proportion to the sines of angles of one half the number of degrees indicated by the respective numerals of the graduations, and means on the scale indicating the length of radius of an arc on which said distances may be laid off as chords, to indicate the position of the sides of the corresponding angles.

3. A protractor scale having a graduated straight line in which the graduations are consecutively numbered from 0 to 90 and in which the distance from the 0 to the 60 point indicates the unit on which the scale is based and the other graduations indicate, on the basis of the unit, distances from the zero point thereto which are equal to the sines of angles of one-half the number of degrees indicated by the numeral of the corresponding graduation.

4. A protractor scale having a series of consecutively numbered points arranged at straight line distances from an initial point, which are respectively equal to the length of chords which will subtend arcs of a circle having a radius equal to one of said distances, the number of degrees in each arc thereof being equal to the number of the point indicating the length of its chord.

In testimony whereof I have signed my name to this specification.

PAUL JONES HARRIMAN.